United States Patent
Nielsen et al.

(10) Patent No.: US 9,697,449 B2
(45) Date of Patent: Jul. 4, 2017

(54) CARD WITH AN OFFSET FIELD GENERATOR

(71) Applicant: CARDLAB APS, Herlev (DK)

(72) Inventors: Finn Nielsen, Copenhagen S (DK); Finn Speiermann, Virum (DK)

(73) Assignee: Cardlab ApS, Herlev (DK)

( * ) Notice: Subject to any disclaimer, the term of this patent is extended or adjusted under 35 U.S.C. 154(b) by 0 days.

(21) Appl. No.: 14/783,298

(22) PCT Filed: Apr. 14, 2014

(86) PCT No.: PCT/EP2014/057506
§ 371 (c)(1),
(2) Date: Oct. 8, 2015

(87) PCT Pub. No.: WO2014/167137
PCT Pub. Date: Oct. 16, 2014

(65) Prior Publication Data
US 2016/0063370 A1   Mar. 3, 2016

(30) Foreign Application Priority Data

Apr. 12, 2013   (WO) ............... PCT/EP2013/057666

(51) Int. Cl.
*G06K 7/08* (2006.01)
*G06K 19/06* (2006.01)

(52) U.S. Cl.
CPC ....... *G06K 19/06196* (2013.01); *G06K 7/084* (2013.01); *G06K 19/06206* (2013.01)

(58) Field of Classification Search
CPC ....... G06K 19/06206; G06K 19/06196; G06K 19/12; G06K 7/084; G11B 5/00808
(Continued)

(56) References Cited

U.S. PATENT DOCUMENTS

| | | |
|---|---|---|
| 4,158,433 A | 6/1979 | Peterson et al. |
| 4,304,992 A | 12/1981 | Kobayashi et al. |
| | (Continued) | |

FOREIGN PATENT DOCUMENTS

| | | |
|---|---|---|
| CA | 2317642 A1 | 3/2001 |
| DE | 19618144 C1 | 4/1997 |
| | (Continued) | |

OTHER PUBLICATIONS

"Magnetic Stripe Card Standards" Magetek 2011 (retrieved from https://www.magtek.com/content/documentationfiles/d99800004.pdf on May 31, 2016).*

(Continued)

*Primary Examiner* — Claude J Brown
(74) *Attorney, Agent, or Firm* — Harness, Dickey & Pierce, P.L.C.

(57) ABSTRACT

An assembly of a card and a card reader, the card reader comprising a reading head configured to be positioned over a predetermined curve of the card while sensing the electromagnetic field and to output a signal relating to the field sensed, the card comprising an oblong field generator comprising at least two end portions configured to output at least part of the electromagnetic field, wherein the end portions are at least 1.8 mm wide and positioned so that, when projected on to a plane of the surface, an edge of each end portion is positioned no more than 0.5 mm from the curve and/or the curve not overlap the end portions in the projection. The curve is defined by the path of the reading head over the card. The card has a generator displaced in relation to standard cards where the generator is positioned directly under the curve.

15 Claims, 3 Drawing Sheets

Figure 1:
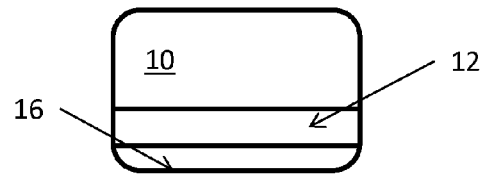

(58) Field of Classification Search
USPC .................................................. 235/450
See application file for complete search history.

(56) References Cited

U.S. PATENT DOCUMENTS

| | | | |
|---|---|---|---|
| 4,825,056 A | 4/1989 | Ohta et al. | |
| 4,829,166 A | 5/1989 | Froelich | |
| 5,159,182 A | 10/1992 | Eisele | |
| 5,563,948 A | 10/1996 | Diehl et al. | |
| 5,585,787 A | 12/1996 | Wallerstein | |
| 5,627,355 A | 5/1997 | Rahman et al. | |
| 5,913,203 A | 6/1999 | Wong et al. | |
| 5,937,394 A | 8/1999 | Wong et al. | |
| 5,955,961 A | 9/1999 | Wallerstein | |
| 5,956,699 A | 9/1999 | Wong et al. | |
| 6,325,285 B1 | 12/2001 | Baratelli | |
| 6,592,044 B1 | 7/2003 | Wong et al. | |
| 6,607,127 B2 | 8/2003 | Wong | |
| 6,607,362 B2 | 8/2003 | Lum | |
| 6,609,654 B1 | 8/2003 | Anderson et al. | |
| 6,657,538 B1 | 12/2003 | Ritter | |
| 6,715,679 B1 | 4/2004 | Infosino | |
| 6,755,341 B1 | 6/2004 | Wong et al. | |
| 6,805,288 B2 | 10/2004 | Routhenstein et al. | |
| 6,811,082 B2 | 11/2004 | Wong | |
| 7,195,154 B2 | 3/2007 | Routhenstein | |
| 7,278,025 B2 | 10/2007 | Saito et al. | |
| 7,503,485 B1 | 3/2009 | Routhenstein | |
| 7,559,464 B2 | 7/2009 | Routhenstein | |
| 7,693,798 B2 | 4/2010 | Anderson et al. | |
| 7,748,616 B2 | 7/2010 | Wong et al. | |
| 7,874,480 B2 | 1/2011 | Routhenstein | |
| 7,954,724 B2 | 6/2011 | Poidomani et al. | |
| 8,191,772 B2 | 6/2012 | Anderson et al. | |
| 8,226,001 B1 | 7/2012 | Foo et al. | |
| 8,231,063 B2 | 7/2012 | Poidomani et al. | |
| 8,286,889 B2 | 10/2012 | Poidomani et al. | |
| 8,302,871 B2 | 11/2012 | Poidomani et al. | |
| 8,313,037 B1* | 11/2012 | Humphrey | G06K 19/06206 235/379 |
| 8,317,103 B1 | 11/2012 | Foo et al. | |
| 8,360,332 B2 | 1/2013 | Poidomani et al. | |
| 8,376,239 B1 | 2/2013 | Humphrey | |
| 8,480,002 B2 | 7/2013 | Poidomani et al. | |
| 8,485,446 B1* | 7/2013 | Mullen | G06K 19/06206 235/379 |
| 8,500,019 B2 | 8/2013 | Poidomani et al. | |
| 8,540,165 B2 | 9/2013 | Foo et al. | |
| 8,579,203 B1* | 11/2013 | Lambeth | G06Q 20/3415 235/380 |
| 8,678,276 B2 | 3/2014 | Poidomani et al. | |
| 8,684,267 B2 | 4/2014 | Foo et al. | |
| 8,690,055 B2 | 4/2014 | Anderson et al. | |
| 8,763,916 B1* | 7/2014 | Foo | G06K 19/06196 235/492 |
| 9,010,644 B1* | 4/2015 | Workley | G06K 19/06206 235/380 |
| 9,053,398 B1* | 6/2015 | Cloutier | G06K 19/06206 |
| 2002/0032657 A1 | 3/2002 | Singh | |
| 2003/0106935 A1 | 6/2003 | Burchette | |
| 2004/0035942 A1 | 2/2004 | Silverman | |
| 2004/0129787 A1 | 7/2004 | Saito et al. | |
| 2004/0133787 A1 | 7/2004 | Doughty et al. | |
| 2005/0133606 A1* | 6/2005 | Brown | G06K 19/06187 235/493 |
| 2006/0091989 A1 | 5/2006 | Vinciarelli et al. | |
| 2006/0124756 A1* | 6/2006 | Brown | G06K 19/06206 235/492 |
| 2006/0283958 A1 | 12/2006 | Osterweil | |
| 2007/0176622 A1 | 8/2007 | Yamazaki | |
| 2008/0116285 A1* | 5/2008 | Shoemaker | G06K 19/06206 235/493 |
| 2008/0121726 A1* | 5/2008 | Brady | G06K 19/06196 235/493 |
| 2009/0159663 A1* | 6/2009 | Mullen | G06K 19/06206 235/379 |
| 2010/0019031 A1* | 1/2010 | Sugiyama | G06K 19/06196 235/380 |
| 2011/0174874 A1* | 7/2011 | Poznansky | G06K 19/12 235/379 |
| 2012/0187199 A1 | 7/2012 | Poidomani et al. | |
| 2014/0138449 A1* | 5/2014 | Goldman | G06K 19/06206 235/492 |
| 2015/0069126 A1* | 3/2015 | Leon | G06K 19/06206 235/449 |

FOREIGN PATENT DOCUMENTS

| | | |
|---|---|---|
| DE | 19648767 A1 | 6/1997 |
| EP | 0373411 A2 | 6/1990 |
| EP | 0994439 A2 | 4/2000 |
| EP | 1231562 A1 | 8/2002 |
| EP | 1326196 A1 | 7/2003 |
| GB | 2243235 A | 10/1991 |
| JP | 5049959 B2 | 10/2012 |
| JP | 5186539 B2 | 4/2013 |
| RU | 2062507 C1 | 6/1996 |
| RU | 2216114 C2 | 11/2003 |
| WO | WO-00/49561 A1 | 8/2000 |
| WO | WO 01/31577 A1 | 5/2001 |
| WO | WO-01/52204 A1 | 7/2001 |
| WO | WO-2008/104567 A1 | 9/2008 |

OTHER PUBLICATIONS

International Search Report PCT/ISA/210 for International Application No. PCT/EP2014/057506 Dated Jun. 2, 2014.

* cited by examiner

CARD WITH AN OFFSET FIELD GENERATOR

CROSS-REFERENCE TO RELATED APPLICATIONS

This is a National Phase of PCT Patent Application No. PCT/EP2014/057506, filed on Apr. 14, 2014, which claims priority under 35 U.S.C. §119 to PCT Patent Application No. PCT/EP2013/057666, filed on Apr. 12, 2013, the contents of each of which are hereby incorporated by reference in their entirety.

The present invention relates to a card, such as a credit card, an ID card or the like which is configured to output or provide an electromagnetic field along a predetermined curve on or at a surface thereof. This type of card may emulate an old-fashioned credit card with a magnetic stripe having one or more tracks of signals encoded in the magnetic stripe, but unlike the static magnetic stripe, a field generator is provided for outputting a modulated field emulating that sensed by a reading head moving along a track of the old-fashioned credit/ID card.

Credit cards of this type may be seen in e.g. WO01/52204, EP1326196, U.S. Pat. No. 6,325,285, WO01/31577, WO00/49561, EP0994439, US2004/133787, EP1231562, US2003/106935, GB2243235, U.S. Pat. No. 4,158,433, DE19648767, DE19618144, U.S. Pat. No. 5,627,355, CA2317642, U.S. Pat. No. 6,715,679, CA2317642, U.S. Pat. No. 7,278,025, U.S. Pat. No. 4,829,166, U.S. Pat. No. 4,825,056, US2002/032657, RU2062507, U.S. Pat. No. 5,563,948, RU2216114, U.S. Pat. No. 6,657,538, U.S. Pat. No. 4,304,992, US2004/0035942, US2007/0176622, U.S. Pat. No. 6,607,362, US2004/0129787, US2006/0283958, and US2006/0091989.

A first aspect of the invention relates to a card configured to provide an electromagnetic field along a predetermined curve on or at a surface thereof, the card comprising an oblong field generator comprising at least two end portions configured to output at least part of the electromagnetic field, wherein the end portions have a width of at least 1.8 mm in a direction perpendicular to a longitudinal axis of the generator and are positioned so that, when projected on to a plane of the surface:
- an edge of each end portion is positioned no more than 0.5 mm from the predetermined curve and/or
- the predetermined curve does not overlap the end portions in the projection.

In this context, a card may have the same dimensions as a credit card, as e.g. defined in ISO/IEC 7810 ID-1: 85.60× 53.98 mm, with a thickness of 0.76 mm, as is the most widely used dimension for banking and ID cards. The present card thus preferably is a flat, thin, rectangular card configured to be received in ATMs and other card readers used for entrance control, funds transfer, banking operations, cash withdrawal and the like. These card readers may be swipe type readers where a user is requested to swipe the card through a slit, inside which a card reading head is positioned, or readers configured to receive a card into a slot of a housing and which automatically translate or move the card to a reader head provided inside the housing.

The present card preferably is bendable and generally fulfils other parts of ISO/IEC 7810 ID-1, such as the bendability and dimensional stability. This standard also relates to flammability, toxicity, resistance to chemicals, resistance to deterioration from exposure to light and heat, as well as the durability of the card. Naturally, these requirements are also desired fulfilled, but such demands may differ from situation to situation, whereby such requirements may not always be required fulfilled.

Naturally, other card shapes or dimensions may be selected outside this standard, which is widely used but in no way a limitation to the invention. Thus, cards of other shapes, such as square, triangular, circular, oval and with other thicknesses and other dimensions are equally useful in accordance to the invention.

The card is configured to provide an electromagnetic field along a predetermined curve on or at a surface of the card. The intention is to emulate the operation of an old-fashioned credit card when a reading head is translated along the magnetic strip thereof and over the curve. However, differences exist. For example, the present field of the card according to the invention need not vary along the length of the curve. Instead, the field may be made to vary over time, so that a reading head, moving in relation to the card or stationary, may detect a varying electromagnetic field. In fact, typically the same signal and field is output over all of the curve at any point in time. Thus, the actual position of the reader in relation to the curve may be irrelevant or of little relevance.

The positions of these curves or tracks may be as defined in e.g. ISO7811-2 in relation to cards with the dimensions as defined above.

In this context, the curve will usually start and end within the boundaries of the card, such as within the outer boundaries of the card when seen directly from above a main surface or side thereof. This curve may have any shape, such as a bent, V-shaped, U-shaped, S-shaped shape, but a straight line is preferred. Usually, this straight line is selected or defined to be parallel to an edge or side of the card.

The curve may or may not be indicated on the card surface. The card surface usually will be a major surface of the card, such as one of the largest surfaces of the card where, often, printed information, such as logos and the like, is provided. Often, the surface is flat or plane.

The curve is a curve at which the electromagnetic field is desired or required. Thus, the curve may be a track on the card directly over which a reading head or coil is supposed to be translated for detecting the field emitted by the card. Consequently, the curve often will be defined or dictated by a reader or a standard defining the relative positions of the card and a reading head/coil.

The card has an elongated or oblong field generator. In this context, the field generator is oblong, if its largest dimension (longitudinal axis) e.g. is more than twice the size of a largest dimension perpendicular to an axis of the longest dimension (longitudinal axis). The field generator may be straight or have any other shape, such as a bent shape, a U-shape, a V-shape, an S-shape or the like.

In this context, the field generator is an element or device configured or able to output an electromagnetic field. A typical field generator comprises a coil which is suitable for converting an electrical signal into an electromagnetic field. The coil may therein have a core if desired. Naturally, this coil may be replaced by a number of coils or one or more other elements configured to convert an electrical or optical signal into an electromagnetic signal. In the latter situation, the coils preferably have longitudinal axes at least substantially parallel with the card plane and form a series or row of coils.

Preferably, the generator/coil has a central axis at least substantially parallel to plane of a major surface of the card, or the generator/coil is positioned in a generator/coil plane at least substantially parallel to the card plane.

The field generator has at least two end portions configured to output at least part of the electromagnetic field. A coil e.g. will output an electromagnetic field from the ends thereof, but an electromagnetic field may also be output along a length of the coil.

The end portions may be end portions of a coil or outer or extreme end portions of outer or extreme coils of a number of coils, if the elongated field generator comprises a number of coils. The end portions may alternatively be end portions of one or more cores provided inside the coil(s) if desired, cf. below. An end portion may be defined by the extreme or outermost 10%, such as the extreme or outermost 1% of the length of the field generator.

Each end portion has an edge or part in the projection. This edge may be defined by a portion of or at the end portion which extends in a longitudinal direction of the oblong field generator. This may be a part of a longer side of a rectangle and at a corner, where the shorter sides define the end portions. Alternatively, the edge may be a part of the end portion which is the closest to the curve.

The end portions, at least when being no more than 0.5 mm from the curve, have a width of at least 1.8 mm perpendicularly to the longitudinal axis or direction of the generator. Usually, this width is along a direction parallel to a major surface of the card. This width may be at least 2 mm and often around 2.4-2.5 mm or more. Naturally, this width may be preferred in all embodiments of the invention.

When the generator comprises a coil, the width may be an outer diameter thereof or a width of a core material in the coil, if existing.

This edge may be positioned no more than 0.5 mm from the predetermined curve, so that an overlap between, in the projection, the curve and the end portions is allowed, as long as it is of this small size.

Alternatively, no overlap may exist so that the end portions, in the projection, are provided at one side of the curve.

In one embodiment, not only the edge or outer boundary at the end points but also along the length of the generator may fulfil the requirement that is either is no more than 0.5 mm from the curve, or the curve has, in the projection, no overlap with the outline of the generator.

Naturally, this distance may also be described as an angle between e.g. the card surface and a straight line from an end point and a point on the curve on the surface, where the point on the curve is that the closest to the end point. This line usually will intersect the card surface, as the end points usually will be provided inside the card and the curve at or on the surface. This angle will describe both the depth at which the end points are provided as well as the above distance. Again, the angle, when sufficiently different from 90 degrees, will describe under which angles the field from the end points enter a reading head.

The card may comprise a controller configured to output to the generator an electrical signal which, in the generator, may be converted into the electromagnetic field—preferably a field varying over time and having therein information to be output from the card. This information may be the information or the type(s) of information output by standard credit/ID cards.

In one embodiment, the card has an outer, at least substantially straight side and wherein the curve may be a straight line positioned between 6.9 mm and 7.2 mm from the side. This is the position of the first track of a card according to ISO/IEC 7811-2 card. Hitherto, great effort has been made to provide the field generator directly below this curve, but according to the invention, this is not an advantage.

In one embodiment, the end portions are positioned, when projected on to the plane, no more than 5 mm from the predetermined curve. This distance may be no more than 4.5 mm, no more than 4 mm, for example. If this distance becomes too large, the field available for a reading head at the curve may be insufficient.

In one embodiment, the curve is an at least substantially straight line extending between a first curve end point and a second curve end point on or at the surface and wherein the end portions are positioned so that the first and second curve end points, when projected on to a straight line through the end portions, are positioned between the end portions. Thus, the end portions are provided on either side of the extreme positions of the curve, so that if a reading head moves along the curve, it will experience the field lines exiting one end portion and directed toward the other end portion. This is irrespective of whether the end portions are those of one or more core materials and/or one or more coils.

In one embodiment the field generator comprises a core material extending within a coil, as mentioned earlier. This core material, or a plurality of core materials if provided, preferably extends within a plane at least substantially parallel to the surface of the card. If a core material is used, it may also form part of the end portions.

Normally, the coil(s) is/are wound around the core material(s) in order for the coil(s) to generate a field in the core material(s).

In one situation, the card may be configured to provide an additional electromagnetic field, which is usually independent of the above-mentioned electromagnetic field, along a second predetermined curve on or at the surface, the card comprising a second oblong field generator with two second end portions, which have the width described above, configured to output at least part of the additional electromagnetic field, the second field generator comprising a second coil, wherein the second end portions are positioned so that, when projected on to the plane of the surface:

an edge of each second end portion is positioned no more than 0.5 mm from the second predetermined curve and/or the second predetermined curve does not overlap the second end portions in the projection.

Usually, the predetermined curve and the predetermined second curve are parallel.

The considerations in relation to the relative positions of the first end portions and the first curve are equally valid in relation to the second curve and the second end portions.

In a preferred embodiment, the second curve is a straight line positioned between 10.2 and 10.5 mm from the above straight side, which is the position of the second track according to the ISO/IEC 7811-2 standard.

In some situations, it is desired to have the card further have a compensating field generator having a first and a second compensating field outputs, wherein the end portions and the compensating field outputs are positioned, when projected on to the plane, so that the end portions are provided on one side of the second curve and the compensating field outputs on an opposite side of the second curve.

Preferably, not only the compensating field outputs but the full compensating field generator, which may of the same type of generator as described above, is positioned to one side of the curve, in the projection, so that all fields emitted by this generator are provided from one side of the second curve. In the same manner, it is preferred that the full field generator of the card is provided on the other side of the second curve.

A compensating field generator may be used for outputting a field, at the second curve, counter-acting the field output by the field generator for use in the first curve but which will also be present, usually to a smaller degree or with a smaller field strength, at the second curve. Thus the compensating field generator may be operated to remove or cancel out this contribution of the field detected at the second curve.

Generally, the compensating field generator may be provided along the guidelines given above for the field generators.

An alternative, or an addition, to the use of compensating field generators may be the subtraction of a signal, in an output from a reading head or coil, of a signal corresponding to that output by the field generator for use at the first curve.

A further alternative or addition is to alter the field output by the second field generator (or a signal fed thereto) in a manner so as to counter-act the field from the field generator for use at the first curve.

As indicated above in relation to the field generators, it is also desired that the compensating field generator(s) be positioned no more than 5 mm from the pertaining curve.

Naturally, a compensating field generator may be provided for each curve.

When the card comprises a signal generator configured to feed a signal to one or more field generators, this may also be used for feeding one or more compensating field generator(s).

A second aspect of the invention relates to an assembly of a card and a card reader, the card reader comprising a reading head configured to be positioned over a predetermined curve of the card while sensing the electromagnetic field and to output a signal relating to the field sensed, the card comprising an oblong field generator comprising at least two end portions have the above-mentioned width and are configured to output at least part of the electromagnetic field,
wherein the end portions are positioned so that, when projected on to a plane of the surface:
 an edge of each end portion is positioned no more than 0.5 mm from the curve and/or
 the curve not overlap the end portions in the projection.

In this context, the reading head may comprise a reading coil or detector configured to convert sensed/detected electromagnetic field into an output signal, which usually will be electrical but which may equally well be optical, wireless, radio-based, an audio signal or the like.

This reading coil or the reading head is configured to be positioned, relative to the card, directly above the curve. The curve, which may be the above predetermined curve, may be a portion of the card directly over which the reading coil/head may be translated. In this context, the reading head/coil is the actual detecting portion of the reader and not including e.g. a housing or the like. Usually, the detector is a coil. In other situations, a coil is connected to an air gap in a magnetic circuit, where the gap is configured to guide magnetic field lines to the coil. Thus, the gap is the actual element defining the curve. The curve may be defined by a predetermined point, such as a centre, of the outline of the reading coil or gap in the projection and the translation of the reading head in relation to the card.

Most card readers are originally configured to provide or facilitate a relative movement of the card and reading head so that the reading head or reading coil travels along and directly above the curve of the card. This is not a disadvantage according to the invention but it is not a requirement. The reading head and/or reading coil may be stationary in relation to the card while detecting the field output, but the reading head/coil is still to be positioned directly above the curve.

In this context, the reading head is over the curve if it is positioned directly above this, i.e. a line perpendicular to the surface and intersecting the surface at the curve will intersect the reading head.

The card of the assembly may be the card of the first aspect of the invention, where the predetermined curve is defined by the position of the reading head/coil/gap.

In one situation where the card has a second field generator, the reading head preferably comprises at least a first and a second field sensor, such as sensing coils, where the first field sensor is configured to be positioned over the curve and the second field sensor is configured to be positioned over another curve, which may be the above second curve.

Naturally, the reading head may be translated in relation to the card to have the field sensors travel along the curves.

Also, the reading head may, if desired, touch or contact the surface of the card during the sensing of the field(s) emitted.

A third aspect of the invention relates to a method of outputting a signal from a card according to the first aspect of the invention, the method comprising the step of operating the field generator to output a magnetic field.

The above description of the curve, the generator etc. is equally valid in relation to the third aspect.

In one embodiment, the operating step comprises operating the field generator to output a magnetic field which varies over time. In this manner, the reading head may be stationary over the curve or may move over or along the curve with any desired speed while detecting and outputting the desired signal.

A final aspect of the invention relates to a method of transferring information from a card to a card reader comprising a reading head, the method comprising:
 positioning the reading head directly above a predetermined curve of the card,
 operating the field generator of the card to output a magnetic field so that at least a part of the magnetic field enters the reading head, and where the card reader outputs a signal corresponding to the at least part of the magnetic field entering the reading head,
wherein the operating step comprises operating a field generator comprising at least two end portions configured to output at least part of the electromagnetic field,
wherein the end portions have the width described above and are positioned so that, when projected on to a plane of the surface:
 an edge of each end portion is positioned no more than 0.5 mm from the curve and/or
 the curve does not overlap the end portions in the projection.

The above description of the curve defined by the reading head, usually a coil or gap, and that it may be identical to the above curve, as well as the generator and the relative positions are equally valid in relation to this aspect.

The operating of the field generator may be feeding an electrical signal thereto, where the field generator is operational to convert the electrical signal into an electromagnetic signal. Preferably, the field generator is able to convert any time dependency or variation into a corresponding field strength dependency or variation. A typical field generator is a coil, optionally with a core material therein.

Thus, information may be encoded in the electrical signal, which information is present also in the field generated and thus in an output signal from the card reader, such as the reading head.

The positioning step may comprise, as mentioned above, abutting the card reader and the card. Alternatively, a distance there between may be e.g. no more than 1 mm, preferably no more than 500 µm, preferably no more than 250 µm, such as no more than 100 µm. Preferably, the distance between the head and the card is maintained at least substantially constant during the operating step.

The operating step comprises the head sensing the field output by the generator.

In one embodiment, the positioning step comprises translating the reading head in relation to the card, where the translation defines the position of the elongate portion, and thus potentially the above curve, on the card.

Figure 2:
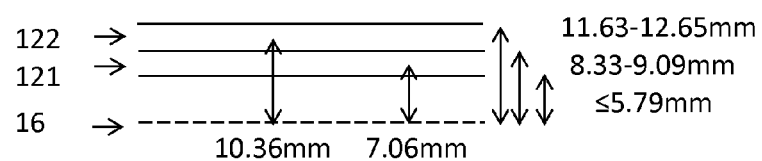
Figure 3:
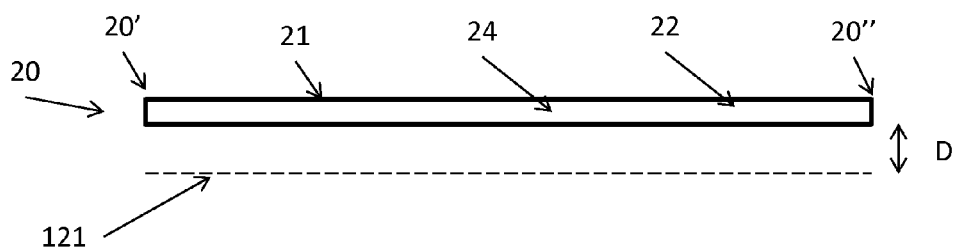
Figure 4:
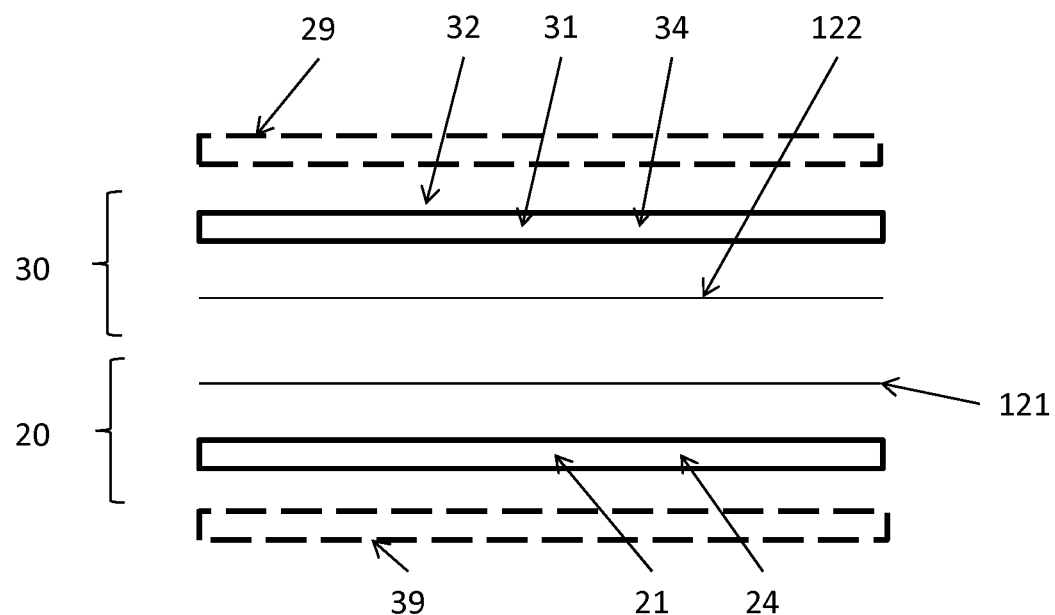
Figure 5:
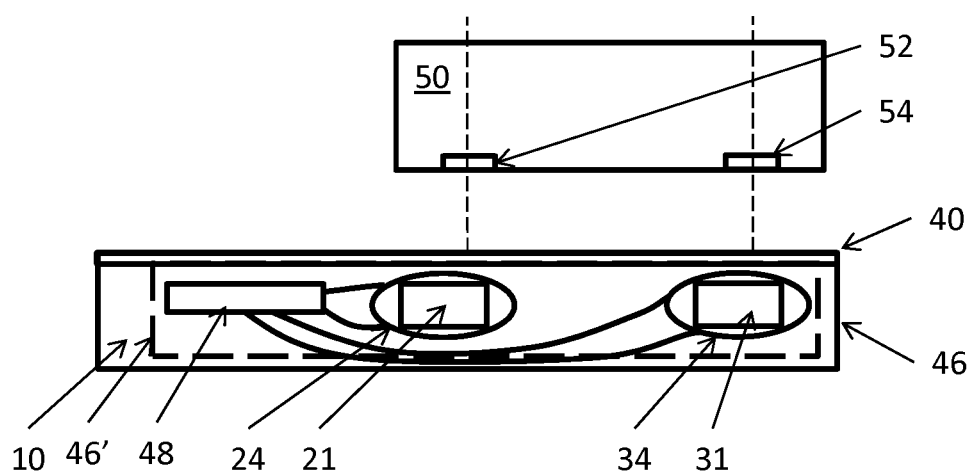
Figure 6:
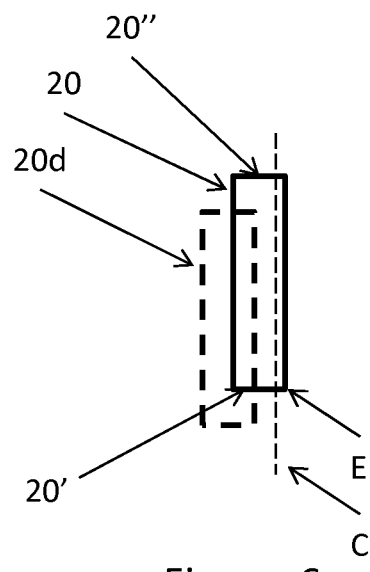

In the following, preferred embodiments of the invention will be described with reference to the drawings, wherein:

FIG. 1 illustrates a credit card with a magnetic stripe,

FIG. 2 illustrates the standardized positions of the individual magnetic tracks of a magnetic card, FIG. 3 illustrates the relative positions of an encoder and a track position, FIG. 4 illustrates two field generators on a card, including compensating coils, FIG. 5 illustrates a cross section of a card according to the invention, and FIG. 6 illustrates relative positioning of a curve and an end point of a generator.

In FIG. 1, a standard credit card 10 is illustrated having a magnetic area 12 positioned in a predetermined and standardized position. The magnetic area 12 typically may comprise two individual strips or signal tracks, 121 and 122, of magnetically encoded information. The positions of these strips or tracks, 121, 122 also is standardized.

According to ISO/IEC 7811-2:2001, the track 121, positioned the closest to the nearest longitudinal side 16 of the card 10 (see FIG. 2), has an edge closest to the side 16 of no more than 0.228" (5.79 mm). The boundary between the first and second tracks 121/122 is between 0.328" (8.33 mm) and 0.358" (9.09 mm) from the edge 16. The second track 122 extends to between 0.458" (11.63 mm) and 0.498" (12.65 mm) from the edge 16. A minimum track width is 0.100" (2.45 mm).

Different sources identify slightly different centre distances from the edge 16 to a centre of the tracks 121 and 122, but the following distances are seen: a distance from edge 16 to centre of track 121: (0.228"+0.328")/2=0.278" (7.06 mm), a distance from edge 16 to centre of track 122: (0.358"+0.458")/2=0.408" (10.36 mm).

Naturally, the tracks 121/122 may be positioned along any curves on the card. The straight lines are preferred as they facilitate a linear swipe or translation of the card in relation to the reader.

The preferred embodiments of the card of the invention have one or more magnetic encoders or field generators positioned at or near the track positions of the card. These encoders are able to generate an electromagnetic field emulating that of a legacy magnetic stripe of a card translated in relation to a reader.

In FIG. 3, an encoder strategy is seen wherein a single encoder 20 is provided having a coil 22 and a core 24, if desired, extending along, preferably parallel to, the curve 121, which may be a centre line of a track, if the track has a width.

The ends 20' and 20" of the coil 22 or core 24, which ever extends the farthest to the right and to the left, defines end points at which a large part of a generated electromagnetic field is output and which will travel to the other end point in a manner defined by the surroundings and the card 10.

According to the invention, the ends 20' and 20" of the coil 22 and/or core 24 of the encoder 20 are provided at a distance D from the curve 121. This distance D preferably may be from −0.5 mm (i.e. with a small overlap) and to several mms. Preferably, the distance D is about 2 mm, but it has been found that improvements of the signal output of a reading head (see FIG. 5) are significant even when there is an overlap and the distance is −0.5 mm. It has been found that the angle under which the field lines from the encoder 20 enter the coil of the reading head in general improves by this offset, especially as it has been found that the coils of most reading heads are not perfectly aligned with the track 121 but is slightly angled in relation thereto. It is desired that the distance, when negative (overlap), is not half a width of the encoder end 20'/20", so especially when an overlap exists, the encoder ends preferably have a width of at least 1.8 mm. This width may be larger if desired.

It is noted that the main field emitted by the encoder 20 is output by the ends 20' and 20". Thus, when the positions of the ends 20' and 20" are fixed, any shape may, in principle, be used for the remainder of the encoder 20. An alternative to the straight encoder 20 of FIG. 3 is a bent or curved encoder, such as an encoder forming part of a circle, an oval or the like.

However, it has been found that the encoder does, in fact, also output a field between the ends. This field may be utilized in order to e.g. compensate from a field strength variation seen between the ends 20' and 20". The field sensed at a position along the track 121 is a sum of the field from the ends 20' and 20" as well as that output along the length of the encoder 20 and thus may be slightly larger at the centre of the track 121. Thus, in one embodiment, core 22/coil 24 may be shaped to bend away from the track 121 to at degree so that the field strength sensed along the track 121 is the same.

In another embodiment, the encoder may simply have the same shape as the emulated track, i.e. preferably straight, with the same distance to the track all along its length.

In FIG. 4, an encoder scheme is illustrated comprising, in addition to the encoder 20, a second encoder 30 as well as compensating elements to be described in further detail.

For illustrative purposes, the encoders 20 and 30 are different. A large variation in encoder schemes, as will also be described further below, may be used. Usually, identical encoder types are used in the same card.

The encoder 20 comprises a field generating element 22 comprising an oblong core material 21 and a coil 24 wound around the core material 21.

The operation of the encoder 20 is that a signal, corresponding to the electromagnetic field to be sensed by the reading head of a reader, which reading head travels along or over the track 121, is transmitted into the coil 24. As a result thereof, the coil 24 and core 21 outputs an electromagnetic field which is sensed by the reading head. As is also indicated above, it is preferred that the distance between the coil 24/core 21 to the track position is about the same along the length thereof. This, however, is not a requirement.

The encoder 30 comprises a field generating element 32 with a core 31 and a coil 34 also positioned according to the invention in relation to another of the standardized positions, 122, of magnetic tracks of credit cards.

In addition to the encoders 20/30, cross talk reducing coils 29/39, which may have cores or not, may be provided in order to prevent cross talk from one encoder to the other when operated simultaneously.

The function of the cross talk reducing coil 29 is to create an electromagnetic field at the track 122 to counter the field created at the guide by the encoder 20 at the track 122 when operating to generate the desired field at the track 121. Thus, it is desired that the resulting field from the encoder 20 and the cross talk reducing coil 29, at the track 121, is zero or as low as feasible.

The operation of the cross talk reducing coil 39 is similar.

An alternative to the operation of the cross talk reducing coils 29/39 is the subtraction, in the signal fed to the encoder 20, for example, of a signal correlated to that fed to the encoder 30 in order for the encoder 20 to, itself, output a field counter acting that of the encoder 30 at the track 121.

In FIG. 5, a card 10 is illustrated in a cross section perpendicular to the coils and cores. Illustrated is also electronics 48 for feeding electrical signals into the coils. The cross talk reducing coils 29/39 are not illustrated but may be provided or not. These usually are also fed by the electronics 48, but this is not a requirement.

Also illustrated is a reading head 50 comprising two reading coils 52 and 54 each positioned so as to travel along the tracks 121/122 while individually receiving the fields output by the encoders 20/30, respectively. Usually, the reading coils 52/54 are positioned directly above (perpendicularly to the upper surface of the card) the track positions 121/122.

In FIG. 5, the positions, in this cross section, of the curves are illustrated by two vertical lines extending perpendicular to the upper card surface. It is seen that the coils 52/54 are positioned directly over the curves, as the lines intersect the centres of the coils 52/54. Thus, the centres of the coils 52/54 define the curves together with the path travelled by such points during swiping of the card. Alternatively, the curves may be defined by other points related to the coils 52/54, or predetermined points in relation to other parts of the head, such as an air gap provided for receiving magnetic field lines and guide these toward the coils 52/54.

Also, it is seen that the cores 21/31 and coils 24/34 are not positioned directly under these curves, as their centres are offset therefrom (see FIG. 6).

Assembly of the card 10 may be performed by providing a base element 46 which may have en indentation or cut-out portion 46' into which a pre-assembled electronic package comprising the electronics 48, coils, cores and connecting wires may be provided. This package may comprise additional elements, such as a battery, a biometric reader, such as a finger print reader, one or more displays, one or more transmitters/transceivers, such as wireless transmitters/transceivers, such as a Bluetooth transceiver, a Wi-Fi transceiver, an RF transceiver or the like, antennas, a keyboard, one or more switches, such as blister switches or piezo based switches (see e.g. WO2008/104567) or the like.

The cut-away and/or electronics may be covered by one or more layers or sheets 40.

The preferred properties of the encoder 20 may be divided into those of the coil 24 and the core 21.

Naturally, a core 21 may be provided or not.

One or more coils 24 may be provided along the length of the core 21 or between the ends 20' and 20". A single coil may be used, in which case it preferably extends at least 70%, such as at least 80%, such as at least 90% of a distance, along the track, between the ends 20' and 20".

Multiple coils may be provided with or without one or more cores. The one or more coils may be driven with the same signal or may be individually driven, such as on the basis of a position of the reading head. Such position determination is known in the art.

In addition, the one or more coils may have the same pitch along the length thereof, or the pitch may be altered along the length in order to control the field strength emitted along the length of the coil.

As to the core, this is preferably capable of transporting a large field strength without the material saturating. Different materials have different B-H curves describing the flux density as a function of magnetic field strength. A material with a straight B-H curve may be the VC6025Z (from www.VacuumSchmelze.de) which has a rather sharp "saturation corner", whereas mu-metal has a much softer characteristic. In the latter situation, the field strength may be kept sufficiently low for it to be in a linear area. Alternative, this non-linear characteristic may be compensated for either in the signal or in the signals resulting from the detection.

Preferably, the permeability of the core material is 100-100,000 μr, such as 5,000-15,000 μr, such as around 10,000 μr. μr being the permeability relative to that of vacuum, μ0.

The sharper corner of the VC6025Z material will cause a higher distortion in case of saturation but may carry more field strength before distorting the output field.

In FIG. 6, the offset of a generator 20 from a curve C is seen in the situation where both are straight, in a projection on to the surface of the card.

Again, the generator has end portions 20' and 20", and an edge E is illustrated being a portion of the end portion 20' being the closest to the curve C. It is seen that the generator 20 is displaced in relation to the curve C, even though an overlap exists.

Also illustrated is another possible, more displaced, position 20d of the generator. It is seen that no overlap exists. Naturally, when no overlap exists, any distance may be seen between the edge E and the curve C.

The invention claimed is:

1. A card having an outer, at least substantially straight side, the card comprising:
an oblong field generator configured to provide an electromagnetic field along a straight line on or at a surface thereof, the straight line being at least substantially parallel to the straight side and positioned between 6.9 mm and 7.2 mm from the side or between 10.2 and 10.5 mm from the side, the oblong field generator including at least two end portions configured to output at least part of the electromagnetic field, the end portions having a width, perpendicular to a longitudinal direction of the oblong field generator, of at least 1.8 mm and are positioned so that, when projected on to a plane of the surface, an edge of each end portion that is parallel with the straight line is positioned no more than 0.5 mm from the straight line in a direction perpendicular to the straight line and/or the edge of each of the end portions of the oblong field generator is parallel with the straight line and separated therefrom by a distance in the projection such that the straight line does not overlap the end portions of the oblong field generator in the projection.

2. The card according to claim 1, wherein
the straight line extends between a first end point and a second end point on or at the surface, and the end portions are positioned so that the first and second end points, when projected on to a straight line through the end portions, are positioned between the end portions.

3. The card according to claim 1, wherein the oblong field generator comprises:
a core material extending within a coil.

4. The card according to claim 1, wherein the card is configured to provide an additional electromagnetic field along a predetermined curve on or at the surface, and the card further comprises:
a second oblong field generator with two second end portions having a width, in a direction perpendicular to a longitudinal direction of the generator, of at least 1.8 mm and being configured to output at least part of the additional electromagnetic field, the second end portions being positioned so that, when projected on to the plane of the surface:
an edge of each second end portion is positioned no more than 0.5 mm from the predetermined curve and/or
the predetermined curve does not overlap the second end portions in the projection.

5. The card according to claim 4, wherein the curve is a straight line being at least substantially parallel to the side and positioned between 10.2 mm and 10.5 mm from the side.

6. The card according to claim 4, further comprising:
a compensating field generator having a first and a second compensating field outputs, wherein
the end portions and the compensating field outputs are positioned, when projected on to the plane, so that the end portions are provided on one side of the curve and the compensating field outputs on an opposite side of the curve.

7. A method of outputting a signal from a card according to claim 1, the method comprising:
operating the oblong field generator to output the electromagnetic field.

8. The method according to claim 7, wherein the operating comprises:
operating the oblong field generator to output the electromagnetic field such that the electromagnetic field varies over time.

9. The card according to claim 1, wherein the edge is a portion of or at the end portion which extends in a longitudinal direction of the oblong field generator.

10. An assembly comprising:
a card having an outer, at least substantially straight side, the card including an oblong field generator configured to provide an electromagnetic field along a straight line on or at a surface thereof, the straight line being at least substantially parallel to the straight side and positioned between 6.9 mm and 7.2 mm from the side or between 10.2 and 10.5 mm from the straight side, the oblong field generator having at least two end portions having a width, perpendicular to a longitudinal axis of the generator, of at least 1.8 mm and being configured to output at least part of the electromagnetic field, the end portions being positioned so that, when projected on to a plane of the surface an edge of each end portion that is parallel with the straight line is positioned no more than 0.5 mm from the straight line in a direction perpendicular to the straight line and/or the edge of each of the end portions of the oblong field generator is parallel with the straight line and separated therefrom by a distance in the projection such that the straight line does not overlap the end portions of the oblong field generator in the projection; and
a card reader including a reading head configured to be positioned over the straight line of the card while sensing the electromagnetic field and to output a signal relating to the field sensed.

11. The assembly according to claim 10, wherein
the reading head includes at least a first and a second field sensor, the first field sensor being configured to travel along the straight line and the second field sensor being configured to travel along a curve, and
the card includes a second oblong field generator configured to provide an additional electromagnetic field along the curve on or at the surface, the second oblong field generator having two second end portions configured to output at least part of the additional electromagnetic field, the second end portions being positioned so that, when projected on to a plane of the surface:
an edge of each second end portion is positioned no more than 0.5 mm from the curve and/or
the curve does not overlap the second end portions in the projection.

12. The assembly according to claim 10, wherein the edge is a portion of or at the end portion which extends in a longitudinal direction of the oblong field generator.

13. A method of transferring information from a card to a card reader head, the card reader head including a reading head, the card having an outer, at least substantially straight side, the method comprising:
operating a field generator of the card to output a magnetic field along the straight line on or at a surface thereof, the straight line being at least substantially parallel to the straight side and positioned between 6.9 mm and 7.2 mm from the side or between 10.2 and 10.5 mm from the side, the field generator including at least two end portions configured to output at least part of the electromagnetic field, the end portions having a width, perpendicular to a longitudinal direction of the generator, of at least 1.8 mm and are positioned so that, when projected on to a plane of the surface, an edge of each end portion that is parallel with the straight line is positioned no more than 0.5 mm from the straight line in a direction perpendicular to the straight line and/or the edge of each of the end portions of the oblong field generator is parallel with the straight line and separated therefrom by a distance in the projection such that the straight line does not overlap the end portions of the oblong field generator in the projection; and
reading, via the reading head, at least a part of the magnetic field, if the reading head is directly above the straight line, wherein the reading head is configured to output a signal corresponding to the at least part of the magnetic field entering the reading head.

14. The method according to claim 13, wherein the positioning comprises:
translating the reading head in relation to the card.

15. The method according to claim 13, wherein the edge is a portion of or at the end portion which extends in a longitudinal direction of the oblong field generator.

* * * * *